J. S. McNEEL & J. M. VANCE.
MILK COOLING AND AERATING APPARATUS.
APPLICATION FILED OCT. 29, 1915.
1,218,791.
Patented Mar. 13, 1917.
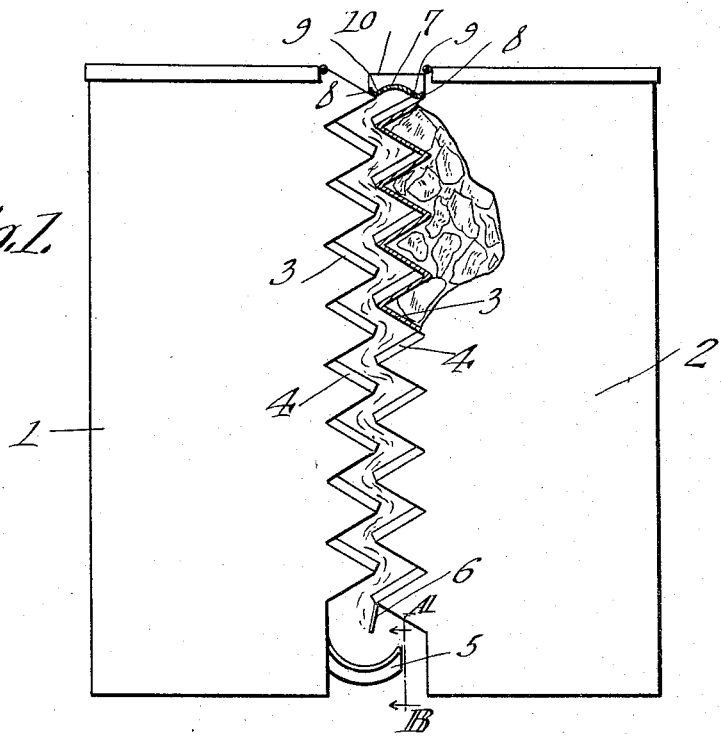
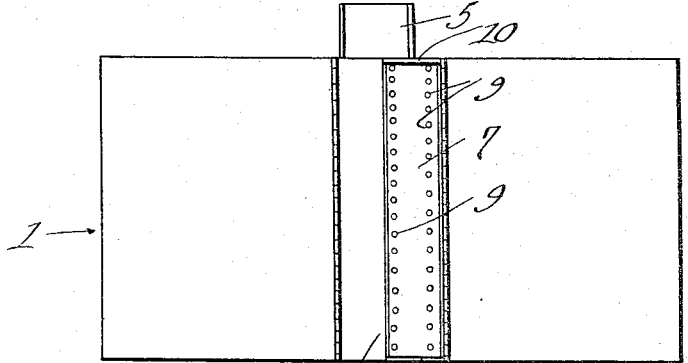
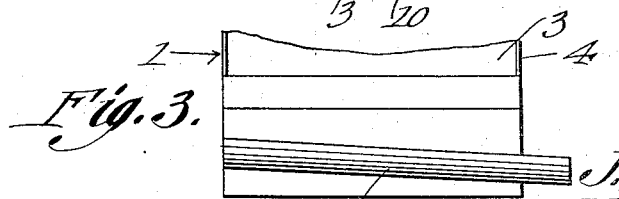
J. S. McNeel
J. M. Vance
Inventors

UNITED STATES PATENT OFFICE.

JAMES S. McNEEL AND JAMES M. VANCE, OF SAN ANTONIO, TEXAS.

MILK COOLING AND AERATING APPARATUS.

1,218,791. Specification of Letters Patent. Patented Mar. 13, 1917.

Application filed October 29, 1915. Serial No. 58,628.

*To all whom it may concern:*

Be it known that we, JAMES S. McNEEL and JAMES M. VANCE, citizens of the United States, residing at San Antonio, in the county of Bexar, State of Texas, have invented a new and useful Milk Cooling and Aerating Apparatus, (Case A,) of which the following is a specification.

This invention relates to apparatus for cooling and aerating milk, one of the objects thereof being to provide simple, inexpensive and efficient apparatus of this character which can be manipulated readily and which does not require the use of any mechanical means for agitating the milk.

A further object is to provide apparatus of this character which has a large capacity and which does not require any special skill to manipulate the same.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—

Figure 1 is a view partly in elevation and partly in section of the apparatus.

Fig. 2 is a top plan view.

Fig. 3 is a section on line A—B Fig. 1.

Referring to the figures by characters of reference 1 and 2 designate opposed tanks formed of sheet metal or any other suitable material and which are adapted to be packed with a suitable refrigerant such as ice. These tanks are placed opposite each other and the adjoining faces thereof are formed with triangular corrugations 3. The corrugations on the two tanks are disposed in staggered relation so that the corrugations on each tank will project between the corrugations on the opposed tank a distance dependent upon the relative adjustment of the two tanks. Upstanding from the ends of each corrugation are retaining flanges 4 and extending from one of the tanks so as to project below the lowermost corrugation is a discharge trough 5 which may be inclined downwardly toward one end and project beyond the tanks. A guide plate 6 may be extended downwardly from the lowermost corrugation so as to direct the liquid into the trough 5. The two uppermost corrugations on the tanks are adapted to support a distributing plate 7 which is bowed transversely as shown in Fig. 1 and is provided with parallel gutters 8 formed with apertures 9. End flanges 10 extend upwardly from the distributing plate to prevent overflow.

In using the apparatus, the two tanks 1 and 2 are filled with a suitable refrigerant, such as ice, and are then adjusted toward each other so as to form a tortuous passage between the corrugated faces, said passage being of a predetermined width. The milk to be cooled and aerated is then poured onto the distributing plate 7 and will flow downwardly in small streams through the openings 9 and onto the corrugations thereunder. These corrugations will cause the liquid thus fed to the apparatus to flow in a thin stream downwardly along the corrugations, said streams flowing from a corrugation on one tank to the adjoining corrugation on the opposed tank, thence back to the next lower corrugation on the first tank. This operation is continued throughout the downward course of the liquid and when it ultimately flows into the trough 5 and issues from the apparatus, it will be found to be in a cool and thoroughly aerated condition.

What is claimed is:—

1. Apparatus of the class described including opposed normally stationary cooling tanks, said tanks having interfitting corrugated faces coöperating to form a tortuous passage extending from the top to the bottom of the apparatus, said tanks being slidable toward or from each other to vary the transverse area of the passage, a discharge trough carried by one of the tanks and located between said tanks and above the bottoms thereof to receive liquid from the tortuous passage, and an apertured distributing plate carried by one of the tanks and normally extending over the passage.

2. Apparatus of the class described including opposed normally stationary cooling tanks, said tanks having interfitting corrugated faces coöperating to form a tortuous passage extending from the top to the bottom of the apparatus, said tanks being slidable toward or from each other to vary the transverse area of the passage, a discharge trough carried by one of the tanks and located between said tanks and above the bottoms thereof to receive liquid from the tortuous passage, means carried by one of the tanks and normally extended over the upper end of the passage for distributing liquid throughout the length and width of the passage, and means upstanding from the ends of the corrugations to prevent lateral overflow of fluid from the passage.

In testimony that we claim the foregoing as our own, we have hereto affixed our signatures in the presence of two witnesses.

JAMES S. McNEEL.
JAMES M. VANCE.

Witnesses:
 ROY BAMEBURG,
 J. D. TLAAZ.

Copies of this patent may be obtained for five cents each, by addressing the "Commissioner of Patents, Washington, D. C."